United States Patent
Degner et al.

(10) Patent No.: US 9,906,167 B2
(45) Date of Patent: Feb. 27, 2018

(54) POWER CONVERTER WITH SELECTIVE DEAD-TIME INSERTION

(71) Applicant: FORD GLOBAL TECHNOLOGIES, LLC, Dearborn, MI (US)

(72) Inventors: Michael W. Degner, Novi, MI (US); Chingchi Chen, Ann Arbor, MI (US); Jun Kikuchi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 305 days.

(21) Appl. No.: 14/601,282

(22) Filed: Jan. 21, 2015

(65) Prior Publication Data

US 2016/0211772 A1    Jul. 21, 2016

(51) Int. Cl.
  *H02P 3/00*      (2006.01)
  *H02M 7/5387*  (2007.01)
  *H02M 1/38*     (2007.01)

(52) U.S. Cl.
  CPC ......... *H02M 7/53871* (2013.01); *H02M 1/38* (2013.01)

(58) Field of Classification Search
  USPC ......... 318/503, 769, 62, 141, 400.1, 400.13, 318/283
  See application file for complete search history.

(56) References Cited

U.S. PATENT DOCUMENTS 5,990,657 A    11/1999  Masaki et al.
6,477,067 B1 *  11/2002  Kerkman ............ H02M 7/5395
                                                      363/132
6,535,402 B1   3/2003  Ying et al.
(Continued)

FOREIGN PATENT DOCUMENTS

JP    02179277    12/1990
JP    03089868     4/1991
JP    07007967     1/1995

OTHER PUBLICATIONS

Lihua Chen et al, Dead-Time Elimination for Voltage Source Inverters, IEEE Transactions on Power Electronics, vol. 23, No. 2, Mar. 2008.

(Continued)

*Primary Examiner* — Eduardo Colon Santana
*Assistant Examiner* — Iftekhar Mustafa
(74) *Attorney, Agent, or Firm* — David B. Kelley; MacMillan, Sobanski & Todd, LLC

(57) ABSTRACT

A power converter has one or more phase legs, each with upper and lower switching devices. A current sensor detects a magnitude of a current flow from a respective leg. A gate driver activates the upper and lower devices according to gate signals determined in response to a PWM control signal. When the detected current magnitude is greater than a positive threshold then the lower gate signal includes a dead-time insertion and the upper gate signal does not include a dead-time insertion. When the detected current magnitude is less than a negative threshold then the upper gate signal includes a dead-time insertion and the lower gate signal does not include a dead-time insertion. When the detected current magnitude is between the positive threshold and the negative threshold then the upper gate signal and the lower gate signal both include a dead-time insertion. Output distortion and control delay are greatly reduced.

12 Claims, 6 Drawing Sheets

(56) References Cited

U.S. PATENT DOCUMENTS

| | | | |
|---|---|---|---|
| 6,940,262 B2 * | 9/2005 | Dequina | H02M 1/38 323/284 |
| 7,151,406 B2 | 12/2006 | Labbé | |
| 7,187,149 B1 | 3/2007 | Balog, Jr. et al. | |
| 7,391,194 B2 | 6/2008 | Brown | |
| 7,589,506 B2 | 9/2009 | Brown | |
| 7,615,887 B2 | 11/2009 | Stancu et al. | |
| 7,659,679 B2 | 2/2010 | Raja et al. | |
| 7,724,054 B2 | 5/2010 | Honda et al. | |
| 8,289,010 B1 | 10/2012 | Fernald et al. | |
| 8,520,420 B2 | 8/2013 | Jungreis et al. | |
| 2003/0062868 A1 * | 4/2003 | Mir | H02P 6/14 318/599 |
| 2007/0249461 A1 | 10/2007 | Tsuji et al. | |
| 2012/0112674 A1 * | 5/2012 | Schulz | B60L 11/1803 318/400.09 |
| 2013/0069570 A1 | 3/2013 | Chen et al. | |
| 2013/0088905 A1 | 4/2013 | Lee et al. | |
| 2013/0200828 A1 | 8/2013 | Miller et al. | |
| 2013/0278200 A1 * | 10/2013 | Fujii | H02P 6/002 318/722 |
| 2014/0042948 A1 | 2/2014 | Green et al. | |
| 2014/0226369 A1 | 8/2014 | Kimura et al. | |

OTHER PUBLICATIONS

Murai et al, Waveform Distortion and Correction Circuit for PWM Inverters with Switching Lag-Times, IEEE Transactions on Industry Applications, vol. IA-23, No. 5, Sep./Oct. 1987.

* cited by examiner

… … …

POWER CONVERTER WITH SELECTIVE DEAD-TIME INSERTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power converters including inverters for an electric drive system of an electrified vehicle, and, more specifically, to selectively inserting a dead-time for controlling switching devices to avoid shoot-through without introducing any significant distortion in the output of the converter.

Electric vehicles, such as hybrid electric vehicles (HEVs), plug-in hybrid electric vehicles (PHEVs), and battery electric vehicles (BEVs), use inverter-driven electric machines to provide traction torque and regenerative braking torque. A typical electric drive system includes a DC power source (such as a battery pack or a fuel cell) coupled by contactor switches to a variable voltage converter (VVC) to regulate a main bus voltage across a main DC linking capacitor. An inverter is connected between the main buses for the DC link and a traction motor in order to convert the DC power to an AC signal that is coupled to the windings of the motor to propel the vehicle. A second inverter may also be connected between the main bus and a generator (if present) to provide another power flow path from a prime mover, typically an internal combustion engine, to the DC link.

The inverters include transistor switching devices (such as insulated gate bipolar transistors, or IGBTs) connected in a bridge configuration including a plurality of phase legs. A typical configuration includes a three-phase motor driven by an inverter with three phase legs. An electronic controller turns the switches on and off in order to invert a DC voltage from the bus to an AC voltage applied to the motor, or to rectify an AC voltage from the generator to a DC voltage on the bus. In each case, the inverters are controlled in response to various sensed conditions including the rotational position of the electric machine and the current flow in each of the phases.

The inverter for the motor may preferably pulse-width modulate the DC link voltage in order to deliver an approximation of a sinusoidal current output to drive the motor at a desired speed and torque. Pulse Width Modulation (PWM) control signals applied to the gates of the IGBTs turn them on and off as necessary so that the resulting current matches a desired current.

Because each phase leg of the inverter has a pair of upper and lower switching devices connected across the DC link, it is important that both devices not be conducting (i.e., turned-on) simultaneously. Otherwise, the resulting "shoot-through" of the phase leg could result in damage to the switching devices. A short time interval during which both the upper and lower switching devices of a phase leg are turned off, known as a dead-time, is typically used in connection with PWM control of inverters in order to prevent shoot-through. However, the insertion of a dead-time has resulted in distortion of the output waveform delivered to the load and the introduction of control delays.

SUMMARY OF THE INVENTION

In one aspect of the invention, a power converter is comprised of a DC link configured to receive a DC supply voltage and at least one phase leg. The phase leg comprises an upper switching device and a lower switching device coupled across the DC link, wherein a junction between the upper and lower switching devices is configured to be coupled to a load such as an electric traction motor for a vehicle. A current sensor for the phase leg detects a magnitude of a current flow from the junction to the load. A gate driver is coupled to the phase leg to activate the upper switching device according to an upper gate signal and to activate the lower switching device according to a lower gate signal in response to a pulse-width modulation (PWM) control signal. When the detected current magnitude is greater than a positive threshold then the lower gate signal includes a dead-time insertion and the upper gate signal does not include a dead-time insertion. When the detected current magnitude is less than a negative threshold then the upper gate signal includes a dead-time insertion and the lower gate signal does not include a dead-time insertion. When the detected current magnitude is between the positive threshold and the negative threshold then the upper gate signal and the lower gate signal both include a dead-time insertion.

DETAILED DESCRIPTION OF PREFERRED EMBODIMENTS

Figure 1:
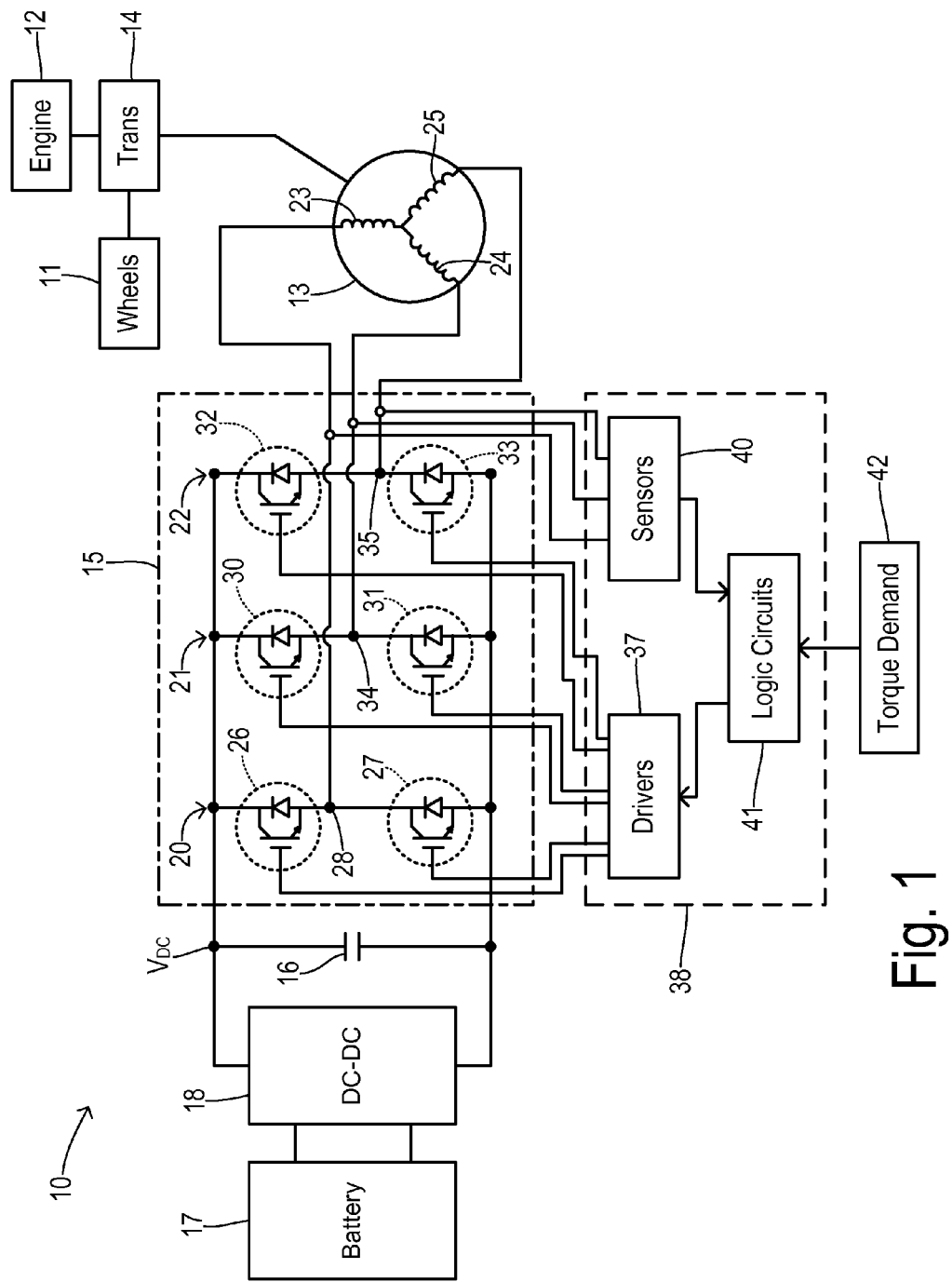
FIG. 1 is a schematic, block diagram showing a powertrain of an electrified vehicle according to one embodiment of the present invention.

FIG. 1 shows a hybrid electric vehicle 10 as one type of vehicle for implementing the selective dead time insertion of the present invention. Vehicle wheels 11 may be driven by an internal combustion engine 12 and/or by a traction motor 13 via a transmission 14. For providing electric propulsion, motor 13 may be driven via an inverter 15 that receives a DC link voltage at a DC link capacitor 16. The DC link voltage may result from conversion of DC power from a battery pack 17 by a converter 18 as known in the art.

Inverter 15 includes phase legs 20, 21, and 22 coupled to motor phase windings 23, 24, and 25. Phase leg 20 has an upper switching device 26 and a lower switching device 27 connected in series across DC link 16 and providing a junction 28 between devices 26 and 27 which is connected to winding 23 of motor 13. Similarly, phase leg 21 has upper switching device 30 and lower switching device 31, while phase leg 22 has upper switching device 32 and lower switching device 33. Junctions 34 and 35 are coupled to motor windings 24 and 25, respectively.

The switching devices may be comprised of IGBTs, antiparallel diodes, wide band gap FETs, or other devices. Each of the upper and lower switching devices has a respective gate terminal coupled to drivers 37 in a controller 38. Current sensors 40 coupled to each of the junctions of the phase legs measure the current flow through each phase winding. Measured current magnitudes are provided from sensors 40 to logic circuits 41 in controller 38 for use in determining PWM switching signals to be applied to the switching devices by drivers 37. As known in the art, the measured current may be compared with a desired motor current as determined according to a torque demand 42 that may be derived from operator input such as an accelerator pedal so that the operator can control the vehicle speed. Thus, current feedback determines a PWM duty cycle within logic circuits 41 that is then used to generate the timing of PWM switching signals for the phase leg switching devices.

Figure 2:
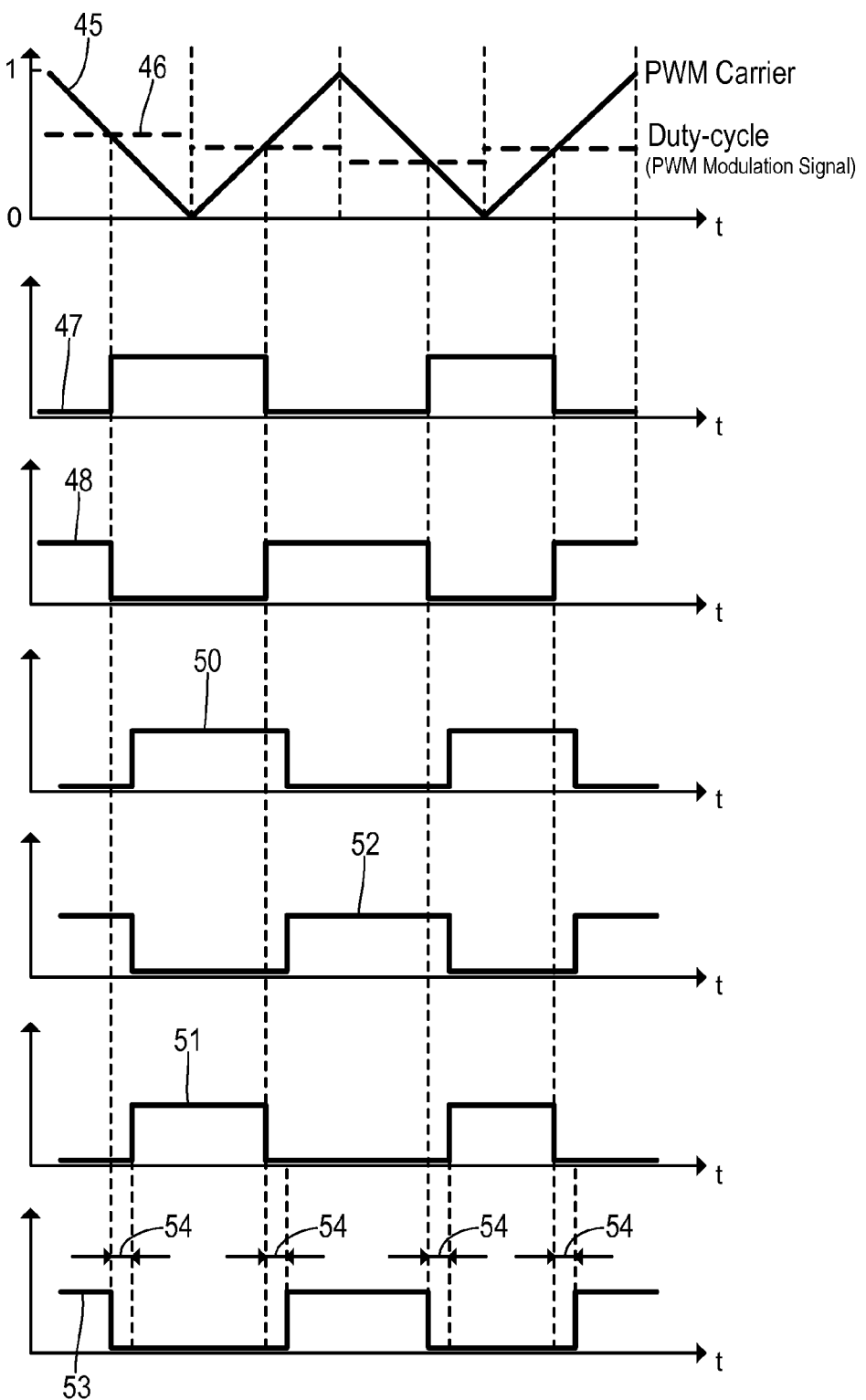
FIG. 2 is a waveform diagram showing the generation of gate signals with and without an inserted dead-time.

FIG. 2 shows a PWM carrier signal 45 which is generated as a triangular waveform at a high frequency (e.g., around 5 kHz) as compared to the rotation frequency of the motor. Using a known PWM method for generating gate-drive switching signals based on current-control, a PWM duty-cycle signal 46 is generated in response to any error between detected current and a target current. Duty-cycle 46 is compared with PWM carrier signal 45 to generate the PWM signals shown below in FIG. 2. A signal 47 is an original upper device gate signal $G_{UO}$ which has a low logic level when PWM carrier signal 45 is greater than duty cycle signal 46 and which has a high logic level when duty cycle signal 46 is greater than PWM carrier signal 45. A signal 48 shows an original lower device gate signal $G_{LO}$ which is the logical inverse of $G_{UO}$ signal 47.

To avoid shoot-through that could occur using original gate signals 47 and 48, dead-time insertion may be performed as follows. A waveform 50 is obtained by introducing a fixed time delay into signal 47. The fixed time delay represents a sufficiently long dead-time insertion that avoids simultaneous activation of both upper and lower switching devices that could occur as a result of noise or propagation delay differences between the upper and lower gate signals (typically having a duration of several microseconds). A dead-time-inserted upper switching device gate signal ($G_{UDI}$) 51 is obtained by forming a logical AND of original gate signal 47 and delayed gate signal 50 as shown. A signal 52 shows a time delayed version of lower gate signal 48 using the same fixed delay. A dead-time-inserted lower switching device gate signal ($G_{LDI}$) 53 is generated as a logical AND of original lower device gate signal 48 and delayed signal 52. In the prior art, dead-time inserted upper and lower gate signals 51 and 53 ($G_{UDI}$ and $G_{LDI}$), respectively, have been used to drive the phase leg switching devices under all conditions, i.e., with a dead time 54 being inserted at every switching event.

Figure 3:
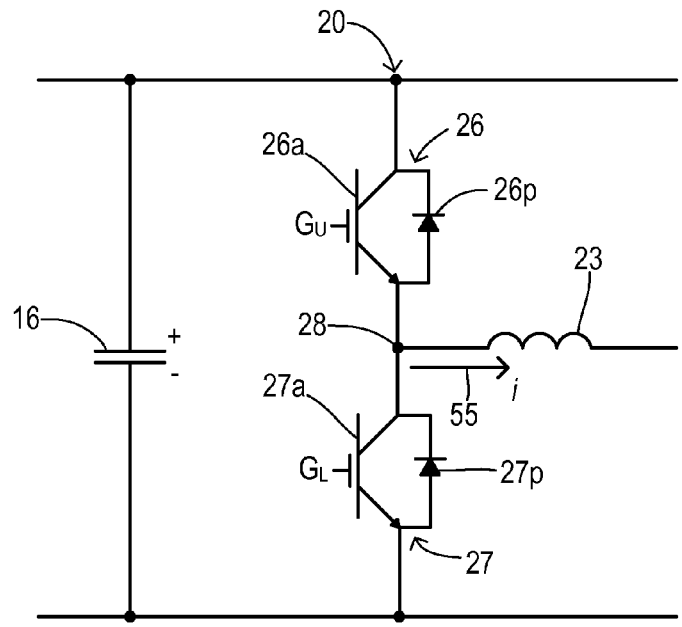
FIG. 3 is a schematic diagram showing one phase leg.
Figure 4:
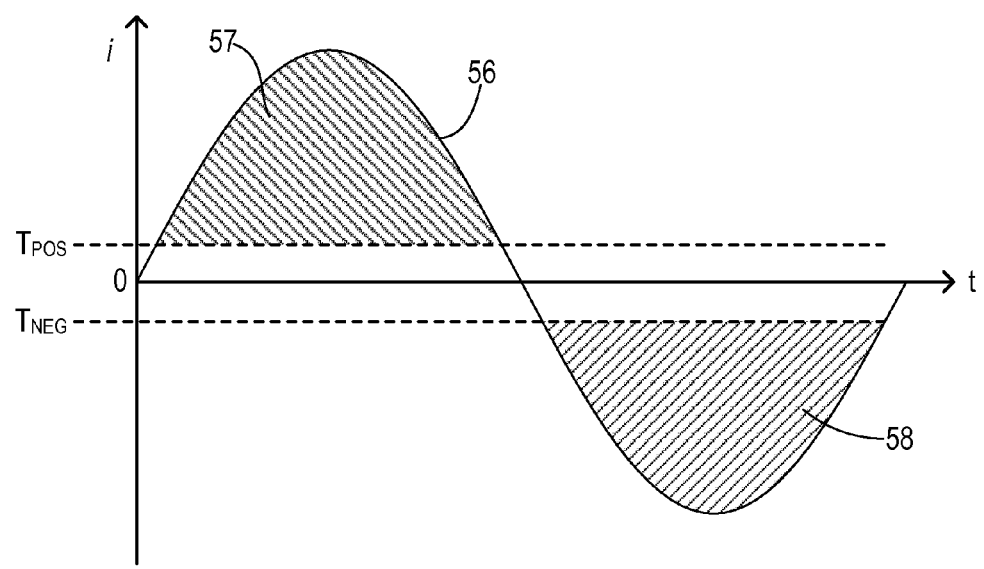
FIG. 4 is a waveform diagram showing threshold current levels for determining whether dead-time should be inserted into a gate drive signal.

FIG. 3 shows phase leg 20 in greater detail wherein a generally sinusoidal flow 55 of current i has a positive value when flowing from junction 28 into motor phase winding 23 and a negative value when flowing from winding 23 to junction 28. FIG. 4 is representative of a phase current 56 for any one of the phase windings, which varies at a frequency corresponding to motor speed. This frequency is lower than the PWM switching frequency in general. The present invention differentiates between a high current region 57 when phase current is greater than a positive threshold $T_{Pos}$ and a low current region 58 when phase current is less than a negative threshold $T_{Neg}$. During times when the phase current is sufficiently positive (i.e., above $T_{Pos}$ in region 57), then switching device commutations for that phase leg are occurring between an active upper switching device 26a and a passive lower switching device 27p. In other words, even though both active devices 26a and 27a are alternately activated, only the active upper device 26a is turned on and the lower active device 27a carries no current because the current direction is against it. The lower passive device 27p carries the current during the time period in which the upper active device 26a is not activated. Under those conditions, the present invention inserts a dead-time only for the lower switching device. A dead-time for only the lower switching device still prevents any shoot-through by ensuring the current direction is against the lower active device 27a. However, since no dead-time is inserted in the upper switching device's gate signal and upper active device 26a is controlling the load current under the condition of i>$T_{Pos}$, there is no introduced distortion or control delay. Similarly, when current is highly negative in region 58, commutations happen between a passive upper device 26p and active lower device 27a. Then dead-time insertion is performed only for the upper device's gate signal. There is no shoot-through concern since the active upper switching device 26a carries no current, but distortion or control delay issues are again avoided because the active lower device 27a does not have a dead-time insertion. When phase current is between positive threshold $T_{Pos}$ and negative threshold $T_{Neg}$, the present invention continues to insert a dead-time for both the upper and lower gate drive signals so that there is no possibility of shoot through caused by current detection errors, offsets, or noise. In inverter motor drive applications, the overall effect in this narrow current band is of little concern because the low-level of current means that the current distortion and controlled delay are also small. The values for the thresholds may be determined by considering ripple in the expected output current and uncertainties in measured current values. The absolute values of the thresholds may typically be equal.

To summarize the preferred dead-time insertion strategy, when a detected phase current magnitude i is greater than $T_{Pos}$ (within region 57), then a upper gate signal $G_U$ does not include a dead-time insertion (i.e., is set to $G_{UO}$ corresponding to signal 47 of FIG. 2) and a lower gate signal $G_L$ does include a dead time insertion (i.e., is set to $G_{LDI}$ corresponding to signal 53 in FIG. 2). When detected current magnitude i is less than negative threshold $T_{Neg}$, then upper gate signal $G_U$ includes a dead-time insertion (i.e., $G_U$ is set to $G_{UDI}$ corresponding to signal 51 in FIG. 2) and lower gate signal $G_L$ does not include a dead-time insertion (i.e., $G_L$ is set to $G_{LO}$ corresponding to signal 48 in FIG. 2). When the detected current magnitude is between thresholds $T_{Pos}$ and $T_{Neg}$, then upper gate signal $G_U$ and lower gate signal $G_L$ both include a dead-time insertion $G_{UDI}$ and $G_{LDI}$ as shown by signals 51 and 53 of FIG. 2.

Figure 5:
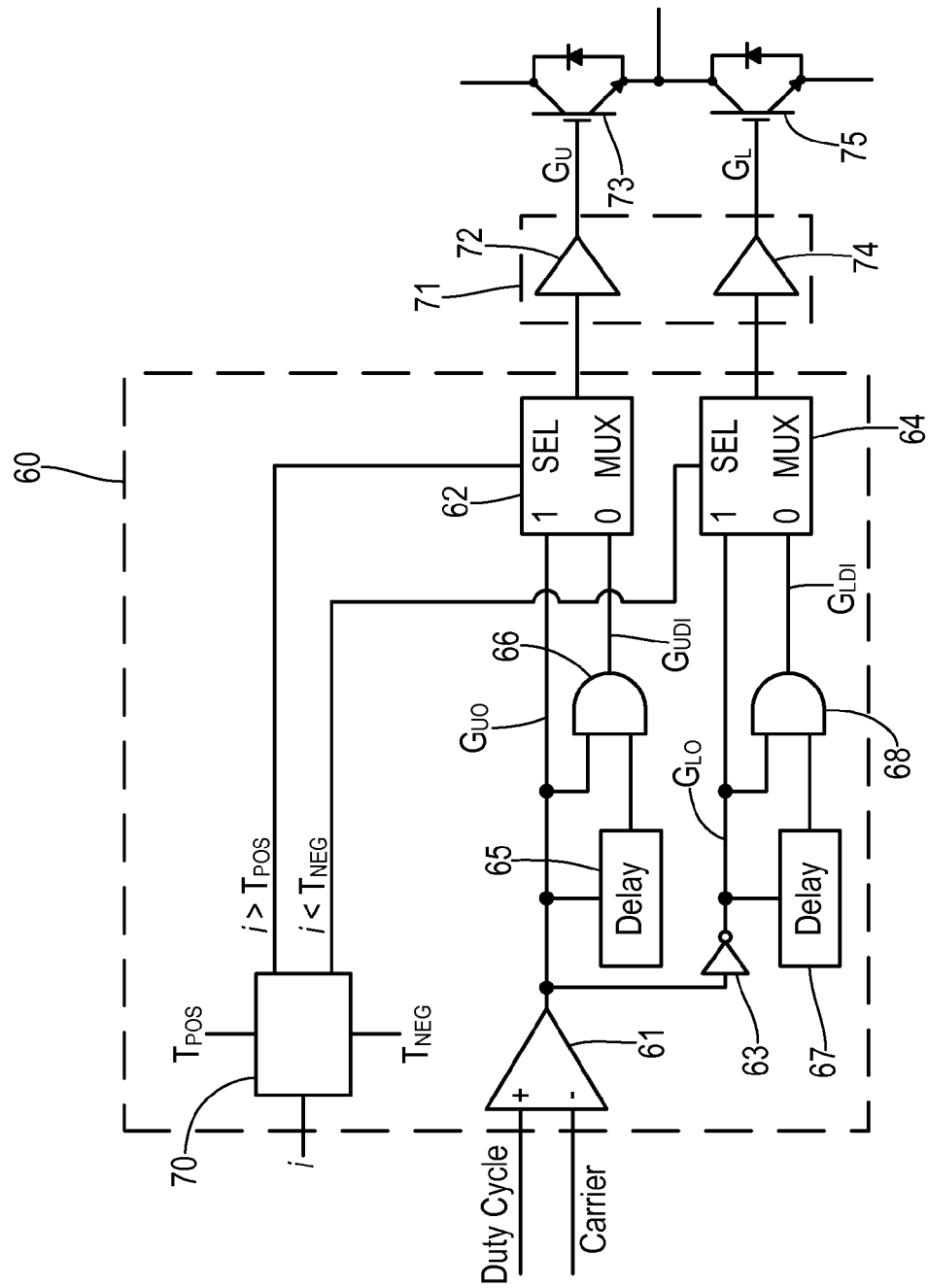
FIG. 5 is a schematic, block diagram showing selection of gate drive signals with and without dead-time insertion according to one preferred embodiment.

FIG. 5 shows a logic circuit 60 for determining selective insertion of dead times according to one preferred embodiment of the invention. Logic block 60 may include dedicated electronic circuit components as shown or may be implemented using a programmable controller such as a microcontroller. A comparator 61 has a noninverting input receiving the duty cycle command signal (e.g. duty cycle signal 46 in FIG. 2). Comparator 61 has an inverting input receiving the PWM carrier signal. In response to the comparison, comparator 61 outputs an original upper gate drive signal $G_{UO}$ to a first input of a multiplexer 62. The first input is a one-selected input which passes through multiplexer 62 when a high logic level (binary "1") signal is present at a Select input (SEL) of multiplexer 62. In addition, the output of comparator 61 is inverted by an inverter 63 to provide an original lower gate drive signal $G_{LO}$ to a first (one-selected) input of a multiplexer 64. Original upper gate drive signal $G_{UO}$ from comparator 61 is delayed in a delay block 65 according to a fixed dead-time insertion delay value, and the delayed signal is input to a first input of an AND-gate 66. The original upper gate drive signal $G_{UO}$ from comparator 61 is connected to a second input of AND-gate 66. The output of AND-gate 66 provides an upper gate drive with dead time insertion signal $G_{UDI}$ which is connected to a zero-selected input of multiplexer 62. Similarly, the output from inverter 63 is delayed in a delay block 67 and coupled with a first input of an AND-gate 68. The second input of AND-gate 68 is connected to the output of inverter 63. An output of AND-gate 68 provides a lower gate drive with dead time insertion signal $G_{LDI}$ to a zero-selected input of multiplexer 64.

A comparison block 70 receives a detected current measurement i for the corresponding phase leg and compares it with positive threshold $T_{Pos}$ and negative threshold $T_{Neg}$. When current i is greater than the positive threshold then a high logical level signal is sent to the SEL input of multiplexer 62 so that the original upper gate drive signal $G_{UO}$ at the first input is output from multiplexer 62 to the input of an amplifier 72 in a driver circuit 71. Otherwise, the input to the select input of multiplexer 62 has a low value and the output provides the upper gate drive signal with dead time insertion $G_{UDI}$ to amplifier 72. An amplified/buffered signal from amplifier 72 drives the gate of upper switching device 73 to provide gate signal $G_U$ with selective dead-time insertion that avoids shoot-through without adding significant distortion or delays in control action.

Similarly, a second output from comparison block 70 controls a select (SEL) input of multiplexer 64 according to whether detected current i is less than the negative threshold. Consequently, either the original lower gate drive signal $G_{LO}$ or the lower gate drive signal with dead time insertion $G_{LDI}$ is coupled through multiplexer 64 to an amplifier 74 in driver circuit 71 and to the gate of a lower switching device 75.

Figure 6:
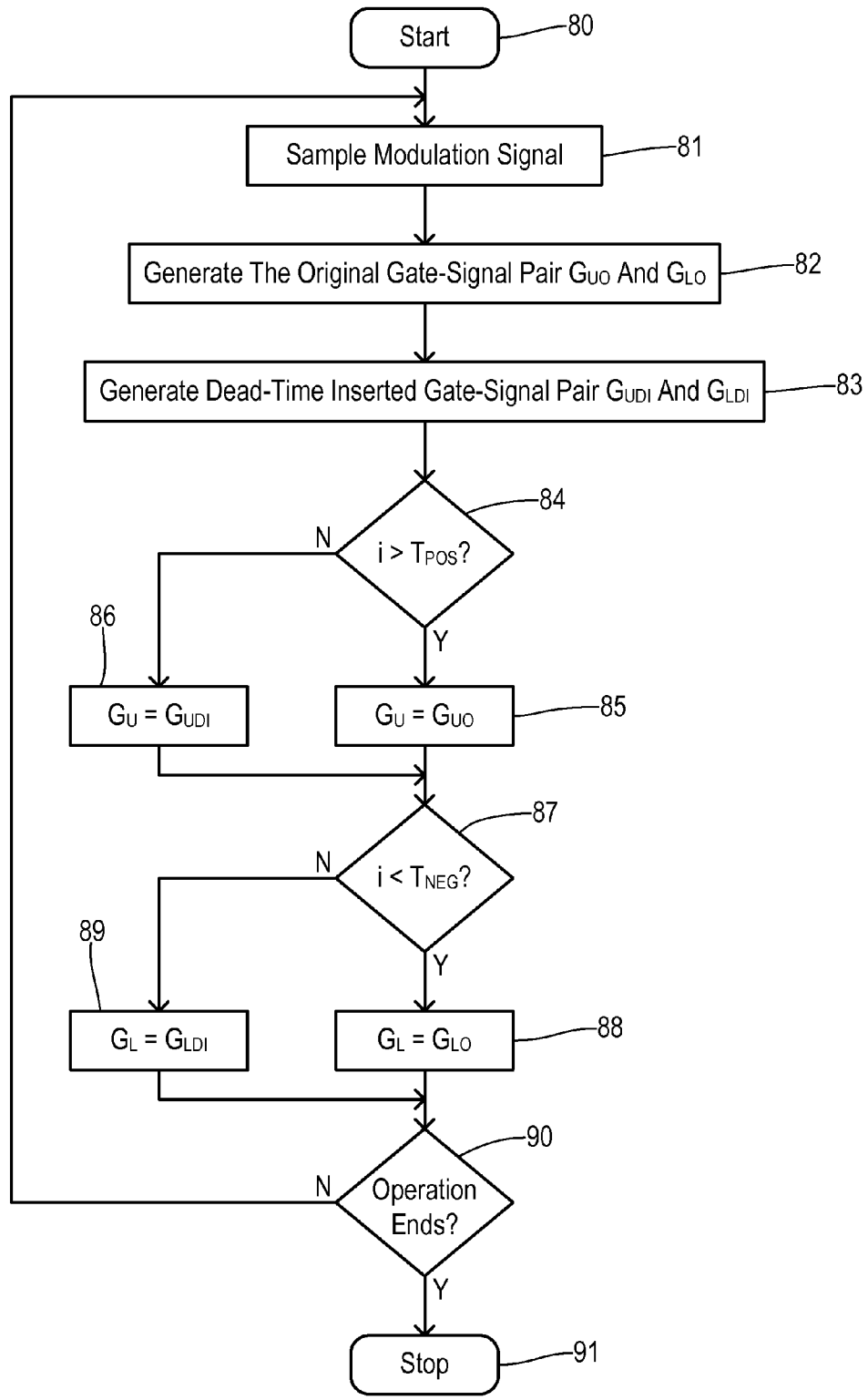
FIG. 6 is a flowchart showing one preferred method of the invention.

A preferred method is summarized in FIG. 6 wherein the method starts at a step 80 and proceeds to sample the pulse width modulation signal in step 81 using PWM modulation (i.e., duty cycle) signal 46 of FIG. 2. Comparison of the PWM carrier signal with the duty cycle command generates an original gate signal pair $G_{UO}$ and $G_{LO}$ in step 82. In step 83, dead-time inserted gate signal pairs $G_{UDI}$ and $G_{LDI}$ are generated for the upper and lower switching devices. A check is performed in step 84 to determine whether the instantaneous phase current is greater than the positive threshold. If so, then the original upper gate drive signal without dead time insertion $G_{UO}$ is assigned as the gate drive signal in step 85, otherwise the dead-time inserted upper gate drive signal $G_{UDI}$ is selected in step 86. Next, the current i is compared to the negative threshold in step 87. If i is less than the negative threshold then the original lower gate drive signal $G_{LO}$ is used in step 88, otherwise the dead-time inserted lower gate drive signal $G_{LDI}$ is selected in step 89. Thus, PWM switching in the phase leg employs selective dead-time insertion such that a switching device carrying a large enough current is switched without a dead-time so that distortion and control delay are avoided. A check is performed in step 90 to determine whether motor operation has ended. If not, then a return is made to step 81 to continue sampling the modulation signal, otherwise the method stops at step 91.

Figure 7:
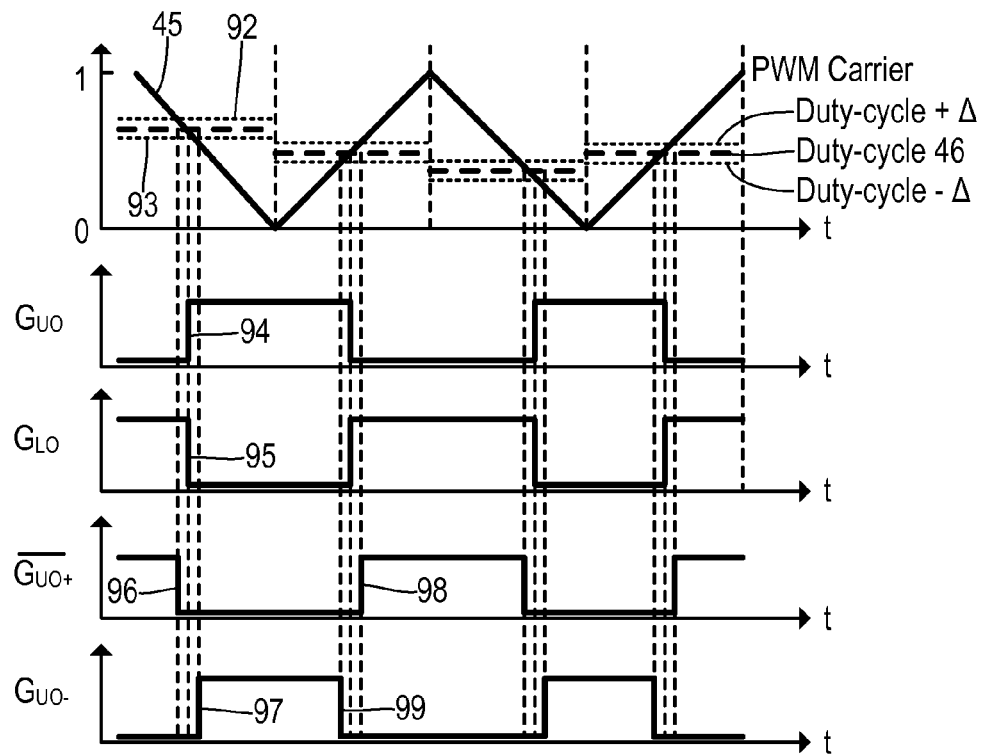
FIG. 7 is a waveform diagram showing an alternate embodiment for generating gate signals with dead-time insertion.
Figure 8:
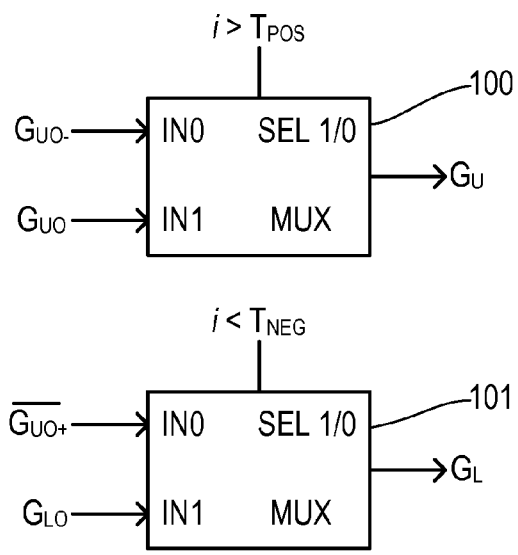
FIG. 8 is a block diagram showing a circuit for selecting the gate signals of FIG. 7.

FIG. 7 illustrates an alternative method for generating the dead-time-inserted signals that does not require delay blocks as shown in FIG. 5. Instead of using explicit signal delays, offset duty cycles 92 and 93 are obtained by adding and subtracting a fixed offset (denoted Δ) from duty cycle signal 46, and the offset values are used for comparison with the PWM carrier when generating the gate drive signals. Thus, the original upper and lower gate drive signals $G_{UO}$ and $G_{LO}$ are obtained in the usual way based on comparing duty cycle 46 with PWM carrier 45, which provides transitions 94 and 95 for the original signals. For generating the dead-time inserted signals, PWM carrier signal 45 is compared with the offset duty cycles as follows. To generate the lower gate dead-time inserted drive signal, PWM carrier 45 is compared with positive offset duty cycle 92 (i.e., commanded duty cycle+Δ) and the result of the comparison is inverted. Thus, the lower gate drive signal with dead-time insertion $G_{LDI}$ is equal to an inverted upper gate drive signal $\overline{G_{UO+}}$ obtained from positive offset duty cycle 92. As shown in FIG. 7, signal $\overline{G_{UO+}}$ has transitions 96 and 98 coincident with the crossings of PWM carrier 45 with positive offset duty cycle 92. To generate an upper dead-time inserted gate drive signal $G_{UDI}$, the negative offset duty cycle 93 is used. Transitions 97 and 99 are shown for this signal which is also denoted $G_{UO-}$ since it is generated using the negative offset. Thus, by employing offsets to the duty cycle, changes in transition times for the gate drive signals are obtained which provide the dead-time intervals. The signals obtained using the method shown in FIG. 7 are input to respective multiplexers 100 and 101 in FIG. 8 for selecting the original or dead time inserted signals in the same manner as discussed above.

What is claimed is:
1. A power converter comprising:
a DC link configured to receive a DC supply voltage;
a phase leg comprising an upper switching device and a lower switching device coupled across the DC link, wherein a junction between the upper and lower switching devices is configured to be coupled to a load;
a current sensor for the phase leg detecting a magnitude of a current flow from the junction of the upper and lower switching devices to the load; and
a gate driver coupled to the phase leg activating the upper switching device according to an upper gate signal and activating the lower switching device according to a lower gate signal in response to a pulse-width modulation (PWM) control signal;
wherein when the detected current magnitude is greater than a positive threshold then the lower gate signal includes a dead-time insertion and the upper gate signal does not include a dead-time insertion;
wherein when the detected current magnitude is less than a negative threshold then the upper gate signal includes a dead-time insertion and the lower gate signal does not include a dead-time insertion; and
wherein when the detected current magnitude is between the positive threshold and the negative threshold then the upper gate signal and the lower gate signal both include a dead-time insertion.
2. The power converter of claim 1 wherein the gate driver generates versions of the gate drive signals with and without dead-time insertion, and wherein the first gate driver selects a version of each gate drive signal in response to a com- parison of the detected current magnitude and the positive and negative thresholds, respectively.

3. The power converter of claim 1 wherein the gate driver is comprised of a programmable controller and an amplifier.

4. The power converter of claim 1 further comprising:
a second phase leg comprising a second upper switching device and a second lower switching device coupled across the DC link, wherein a second junction between the second upper and lower switching devices is configured to be coupled to the load;
a second current sensor for the second phase leg detecting a magnitude of a second current flow from the second junction to the load; and
a second gate driver coupled to the second phase leg activating the second upper switching device according to a second upper gate signal and activating the second lower switching device according to a second lower gate signal in response to the PWM control signal;
wherein when the detected second current magnitude is greater than the positive threshold then the second lower gate signal includes a dead-time insertion and the second upper gate signal does not include a dead-time insertion;
wherein when the detected second current magnitude is less than the negative threshold then the second upper gate signal includes a dead-time insertion and the second lower gate signal does not include a dead-time insertion; and
wherein when the detected second current magnitude is between the positive threshold and the negative threshold then the second upper gate signal and the second lower gate signal both include a dead-time insertion.

5. The power converter of claim 1 wherein the load is comprised of an electric traction motor for a road vehicle, and wherein the PWM control signal corresponds to a desired torque from the traction motor.

6. A method controlling a power converter comprising:
generating upper and lower gate signals for driving respective switching devices in a phase leg;
detecting a current magnitude from the phase leg to a load;
inserting a dead-time only in the lower gate signal if the current magnitude is greater than a positive threshold; and
inserting a dead-time only in the upper gate signal if the current magnitude is less than a negative threshold.

7. The method of claim 6 further comprising the step of:
inserting a dead-time in both the upper gate signal and the lower gate signal if the current magnitude is between the positive threshold and the negative threshold.

8. The method of claim 6 wherein the power converter is an inverter for an electric traction motor of an electrified road vehicle.

9. A power converter comprising:
a DC link configured to receive a DC supply voltage;
a phase leg comprising an upper switching device and a lower switching device coupled across the DC link, wherein a junction between the upper and lower switching devices is configured to be coupled to a load;
a current sensor for the phase leg detecting a magnitude of a current flow from the junction to the load; and
a gate driver coupled to the phase leg activating the upper switching device according to an upper gate signal and activating the lower switching device according to a lower gate signal; and
a controller 1) comparing a PWM carrier signal to a commanded duty cycle to generate original upper and lower gate drive signals, 2) inserting respective dead-times to generate modified upper and lower gate drive signals; 3) selecting the original upper gate drive signal to drive the upper switching device in response to the detected current magnitude being greater than a positive threshold, otherwise selecting the modified upper gate drive signal, and 4) selecting the original lower gate drive signal to drive the lower switching device in response to the detected current magnitude being less than a negative threshold, otherwise selecting the modified lower gate drive signal;
wherein the controller generates the modified upper and lower gate drive signals by 1) delaying the original upper and lower gate drive signals by a dead-time constant, 2) inputting the original upper gate drive signal and the delayed upper gate drive signal to an upper AND-gate to generate the modified upper gate drive signal, and 3) inputting the original lower gate drive signal and the delayed lower gate drive signal to a lower AND-gate to generate the modified lower gate drive signal.

10. The power converter of claim 9 wherein the controller generates the modified upper and lower gate drive signals by 1) generating positive and negative offset duty cycles which are offset from the commanded duty cycle by a predetermined offset, 2) comparing the PWM carrier with the negative offset duty cycle to generate the modified upper gate drive signal, and 3) comparing the PWM carrier with the positive offset duty cycle to generate the modified lower gate drive signal.

11. A method controlling a power converter comprising:
comparing a PWM carrier signal to a commanded duty cycle to generate original upper and lower gate drive signals for a phase leg;
inserting respective dead-times to generate modified upper and lower gate drive signals according to the steps of:
delaying the original upper and lower gate drive signals by a dead-time constant;
inputting the original upper gate drive signal and the delayed upper gate drive signal to an upper AND-gate to generate the modified upper gate drive signal; and
inputting the original lower gate drive signal and the delayed lower gate drive signal to a lower AND-gate to generate the modified lower gate drive signal;
detecting a current magnitude from the phase leg to a load;
selecting the original upper gate drive signal to drive an upper switching device in the phase leg in response to the detected current magnitude being greater than a positive threshold, otherwise selecting the modified upper gate drive signal; and
selecting the original lower gate drive signal to drive a lower switching device in the phase leg in response to the detected current magnitude being less than a negative threshold, otherwise selecting the modified lower gate drive signal.

12. A method controlling a power converter comprising:
comparing a PWM carrier signal to a commanded duty cycle to generate original upper and lower gate drive signals for a phase leg;
inserting respective dead-times to generate modified upper and lower gate drive signals according to the steps of:

generating positive and negative offset duty cycles which are offset from the commanded duty cycle by a predetermined offset;

comparing the PWM carrier with the negative offset duty cycle to generate the modified upper gate drive signal; and comparing the PWM carrier with the positive offset duty cycle to generate the modified lower gate drive signal;

detecting a current magnitude from the phase leg to a load;

selecting the original upper gate drive signal to drive an upper switching device in the phase leg in response to the detected current magnitude being greater than a positive threshold, otherwise selecting the modified upper gate drive signal; and selecting the original lower gate drive signal to drive a lower switching device in the phase leg in response to the detected current magnitude being less than a negative threshold, otherwise selecting the modified lower gate drive signal.

* * * * *